June 6, 1939.   L. J. McGRATH ET AL   2,161,071
METHOD OF PACKING FROZEN FOOD
Filed May 2, 1938   2 Sheets-Sheet 1
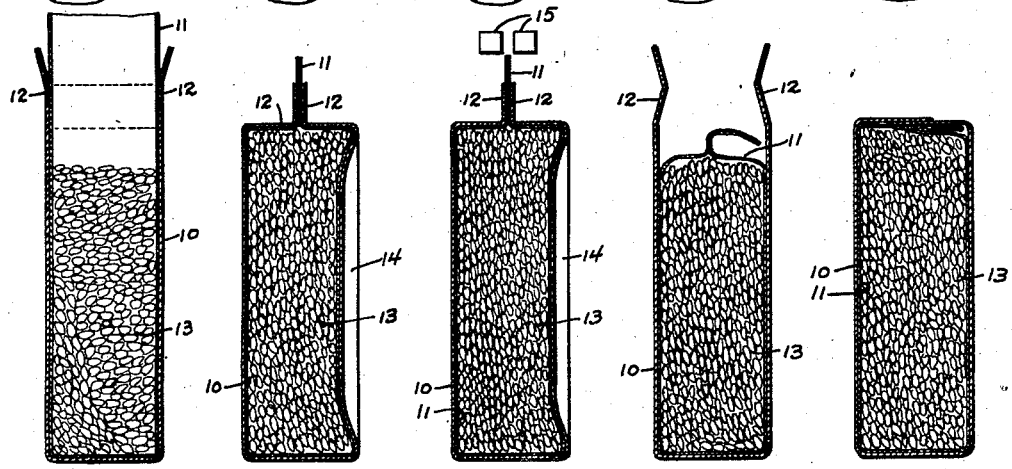
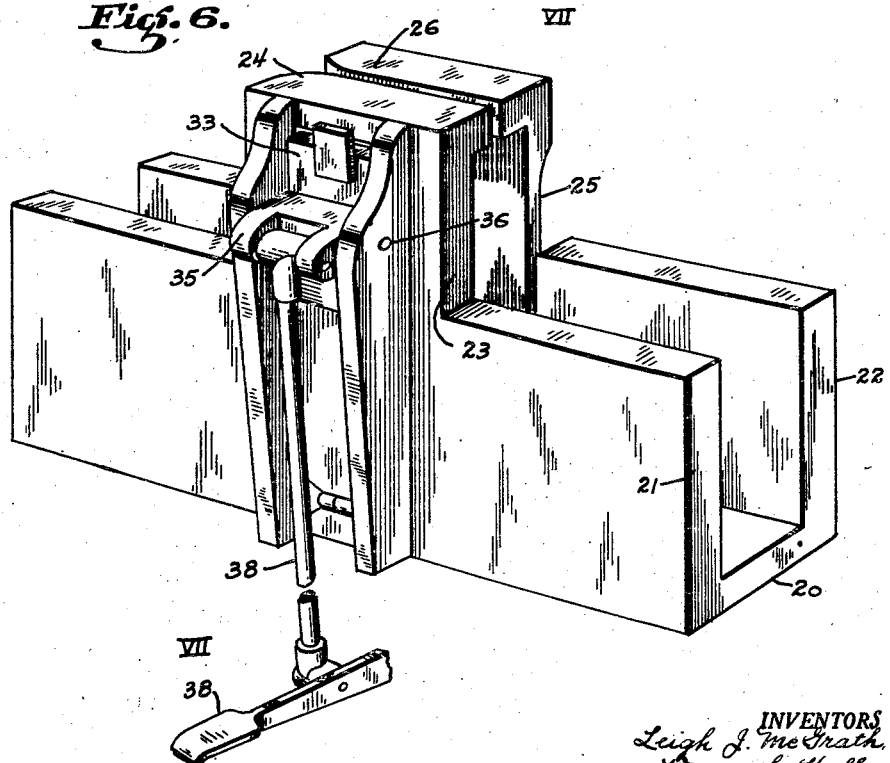
INVENTORS
Leigh J. McGrath
Wayne L. Hall
BY
Chas. E. Townsend
ATTORNEY.

June 6, 1939.                L. J. McGRATH ET AL                2,161,071
                         METHOD OF PACKING FROZEN FOOD
                  Filed May 2, 1938              2 Sheets-Sheet 2
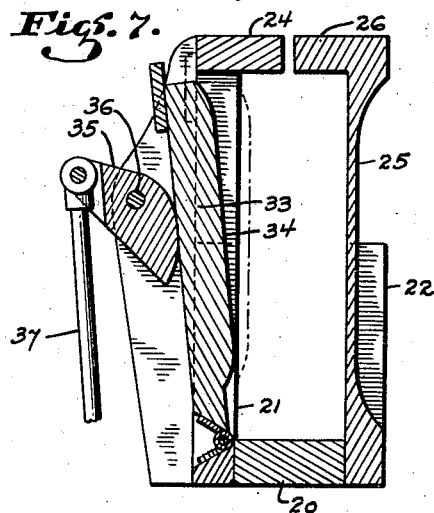
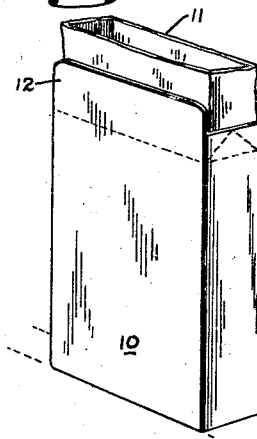
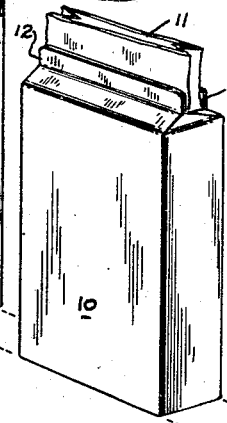
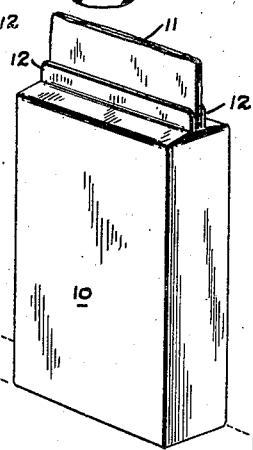
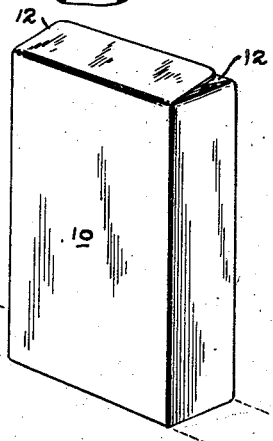
INVENTORS.
Leigh J. McGrath,
Wayne L. Hall.
BY
Chas. E. Townsend.
ATTORNEY.

Patented June 6, 1939

2,161,071

UNITED STATES PATENT OFFICE 2,161,071

METHOD OF PACKING FROZEN FOOD

Leigh J. McGrath and Wayne L. Hall, San Francisco, Calif., assignors to Zellerbach Paper Company, San Francisco, Calif., a corporation of Nevada Application May 2, 1938, Serial No. 205,587

5 Claims. (Cl. 99—171)

The present invention relates to a method of packing frozen food, and particularly to a method of packing frozen products in moisture-proof containers.

It is now common practice to preserve fruits, vegetables and meats in a fresh condition for an indefinite period of time by a fast freezing process. Various forms of containers are in use for these frozen products, most of which are in the form of a carton of pasteboard or like material of suitable size to meet the requirements of retail trade. The product is frozen in a fresh condition, and in order to maintain it in this condition until it is sold to the consumer, it is stored and displayed in a refrigerated atmosphere. Upon sale of these products, the container must be transported to the home of the consumer, and often before opening the package, it has been exposed to warm atmospheres for a time sufficient to permit partial or even complete thawing, so that the contents are semi-liquid. It is therefore important that the container be moisture-proof, and in order to make it so and avoid leakage of any of the liquid resulting from thawing, it is common practice to employ a liner of water-impervious material within the carton. A typical material suitable for this purpose is Cellophane, as it has the advantages of being light, strong, highly transparent, and lends itself readily to sealing processes which produce a water-tight container.

One difficulty encountered in packing frozen products in this manner results from the fact that it is customary and desirable to freeze the product after it is packed and sealed. Due to the phenomenon of expansion which accompanies freezing, the freezing of the product in a sealed container often results in rupture of the package during freezing or, in some cases, the building up of internal package pressures which result in leakage subsequent to the freezing process and while the package is being handled in transportation.

It is therefore the object of the present invention to provide a method of packing products which may expand after packing, such, for example as frozen foods in which the packing, sealing and freezing are accomplished without danger of rupturing or in any way producing a harmful effect on the package and to insure, by simple and inexpensive steps in the process, the production of uniformly packed, leak-proof contents.

While the invention will be described with particular reference to the packing of products to be frozen after packing, it will be apparent from an understanding of the principles of the invention that it is useful in connection with the packaging of any product which may, from any cause other than freezing, be liable to expand within its package.

Further objects and advantages of the invention will be made apparent in the following specification wherein one form of the invention will be described for purposes of illustration, reference being made to the accompanying drawings.

In the drawings—

Figs. 1 to 5, inclusive, are vertical transverse sectional views of a carton being packed according to the method of the present invention, the views illustrating respectively five successive steps of the method;

Fig. 6 is a perspective view of one type of device that may be employed in carrying out some of the steps illustrated in Figs. 1 to 5;

Fig. 7 is a sectional view taken on line VII—VII of Fig. 6; and

Figs. 8 to 11 are perspective views of a carton illustrating the same in the various positions that it assumes during its passage through the device illustrated in Fig. 6.

Water expands about eight and one-half per cent upon being frozen, and this may be taken as the average expansion of most fresh food products, fresh fruits, vegetables and the like having a large water content. Therefore, a container having a height of eleven inches may be filled to a level of approximately ten inches with an unfrozen product, and it may be expected that upon freezing, the product will substantially fill the container. Where a liner of Cellophane or like material is employed and sealed before the freezing takes place, space must be provided within the liner to accommodate this expansion of the product due to freezing. Under ordinary methods where the liner is sealed before the product is frozen, air is entrapped within the liner, and upon the air being compressed as the result of the expansion of the product, an internal pressure is created which is likely to result in bursting or rupturing of the liner either upon freezing or at some time before the package is finally opened by the consumer. The present invention eliminates such entrapped air and at the same time provides space for expansion of the product within the liner without the resultant and undesirable pressure.

The steps of the method employed in accomplishing this are illustrated in Figs. 1 to 5, inclusive, of the drawings. In Fig. 1, a carton of conventional design is illustrated at 10. The carton is lined with a bag or liner 11 of moisture-impervious material which is sealed with the exception of its top end which is left open for the purpose of filling. End closure flaps 12, which form a part of the carton, are provided for the purpose of finally closing the carton after it has been filled. The carton is filled with the contents illustrated at 13 which consist of an unfrozen fresh fruit, vegetable or the like up to a level considerably short of the top of the carton. The exact level will depend upon the type of fruit or vegetable with which the carton is being filled, and is such that upon freezing of the contents they will expand to substantially fill the carton.

The carton is then placed between supporting walls to prevent undesired distortion. The closure flaps 12 are forced to the position illustrated in Fig. 2 with the upper open end of the liner 11 projecting outwardly between them, and pressure is applied to the carton at any desired point, but preferably to one side wall thereof to form a temporary depression therein such as illustrated at 14. The depression 14 serves to displace the contents, causing them to rise upwardly in the carton and to expel substantially all of the air from the upper end of the carton, which air escapes through the upper end of the liner which is not too firmly compressed between the closure flaps to permit such escape.

With the carton and the contents in this position, and before the pressure is released from the side wall thereof, the top open end of the liner 11 is sealed as, for example, by a heat-sealing clamp diagrammatically illustrated at 15 in Fig. 3. Heat sealers are commonly used in connection with Cellophane wrappers, and any conventional form of such a sealer may be used where cellophane is employed for the lining material, but other types of sealers may be used where other materials are used as liners. It is desirable, however, that the sealed effect be a permanent seal and be effected in a manner that will prevent either air or moisture from entering or leaving the liner.

The seal having been made as illustrated in Fig. 3, the pressure which causes the depression 14 is released and the side wall of the carton is so depressed that it springs to its normal position as illustrated in Fig. 4, permitting the contents 13 to fall back to their normal position. As the displacement resulting from the depression 14 is substantially equal to the space to be filled upon expansion due to freezing of the contents, and as all of the surplus air was ejected from the lining due to this depression, when the contents return to the position illustrated in Fig. 4, the upper portion of the liner into which the entry of air is prohibited by the sealing process will be caused to cling or conform to the contour of the contents, although it is sufficiently loose to permit of expansion.

The closure flaps 12 are then released from the position illustrated in Figs. 2 and 3 so that the upper sealed end of the liner may be tucked into the carton as shown in Fig. 4. Upon being frozen, the contents 13 expand to occupy substantially the entire space within the carton, and as shown in Fig. 5, cause the upper collapsed end of the liner to be forced upwardly and against the top of the carton. Thus, by causing expansion of the contents through mechanical means to completely fill the liner, then sealing the liner and releasing the contents so that the filled liner contains no air, and thereafter freezing, both the liner and carton are effectively filled without danger of bursting due to internal pressure.

While it is apparent from the foregoing that the present invention is not limited to any particular style or shape of carton and that various types of devices may be designed to accommodate a variation in the style of cartons and liner employed, Figs. 6 and 7 illustrate a device capable of performing the compressing step of the method described above and capable of being used in connection with filling, sealing and freezing mechanism of any suitable type.

The device illustrated in Figs. 6 and 7 comprises a bottom wall 20 and side walls 21 and 22 forming a channel-shaped track through which a carton to be sealed may slide from left to right. Centrally of the side wall 21 a vertical extension 23 rigidly supports a jaw 24, and centrally of the side wall 22 a resilient panel 25 supports a complementary jaw 26. The space defined by the bottom 20 and the side walls and the jaws 24 and 26, is of a size to permit passage of a carton and to support the walls thereof against outward distortion as it passes therethrough.

The positions occupied by a carton passing through the device illustrated in Fig. 6 are shown in Figs. 8 to 11. In Fig. 8 an open-ended carton is shown with its closure flaps 12 extending upwardly and with the liner 11 projecting from the top thereof. In this position, the carton will have been filled with the contents to be frozen to the level illustrated in Fig. 1. The closure flaps 12 will then be pressed toward each other to assume the position illustrated in Fig. 9, and the carton is then moved to a position beneath the jaws 24 and 26 which embrace and cause further closing of the flaps as illustrated in Fig. 10, this being the position assumed by the carton when the heat-seal is applied to the upper projecting end of the liner 11.

Prior to the sealing of the upper end of the bag 11, one side wall of the carton is depressed in the position illustrated in Figs. 2 and 3, and this is accomplished by a hinged panel 33 (see Figs. 6 and 7) having a convex face 34 arranged to be pressed against the side of the carton while it is confined in the space between the jaws 24 and 26. The panel 33 is pressed against the side wall of the carton through the medium of a lever 35 pivoted as at 36 and connected by a rod 37 with a foot pedal 38. Upon depression of the foot pedal 38, the convex panel 34 is forced inwardly to form the depression 14 in the side wall of the carton and cause the contents thereof to be forced upwardly to assume a position with respect to the top of the carton approximating the position that they will assume after having been frozen.

When the sealing of the liner has been completed, the carton will be advanced from its position between the confining walls 23 and 25 so that the upper end of the liner may be tucked into the carton and the closure flaps brought to the position illustrated in Fig. 11, in which position they may be secured by a suitable adhesive. At this time the contents have returned to their original level and the liner, having had the air expelled and excluded therefrom, adheres closely to the contents, but is sufficiently loose to permit the expansion which will occur upon subsequent freezing.

Having thus described our invention, what we claim and desire to secure by Letters Patent is:

1. The method of packing a product to be frozen in a moisture-proof container which comprises partially filling the container, applying pressure to raise the level of the contents of the container, sealing the container, releasing the pressure, and then freezing.

2. The method of packing a product to be frozen in a moisture-proof container which comprises filling the container to a level where expansion caused by freezing will substantially fill the container, then applying pressure to raise the level of the contents and exclude air from the container, sealing the container, releasing the pressure, and then freezing.

3. The method of packing a product to be frozen in a moisture-proof container which comprises partially filling the container, closing the container, applying pressure to the container to eject air through the closed end thereof and raise the contents therein, sealing the container, releasing the pressure, and freezing.

4. The method of packing a product to be frozen in a carton having an impervious liner which comprises filling the lined carton to a level short of the top of the carton, closing the carton and liner, applying pressure to the carton to raise the level of the contents substantially to the top and eject air from the liner, sealing the liner, releasing said pressure, and freezing.

5. The method of packing a product to be frozen in a carton having an impervious liner which comprises filling the lined carton but leaving space therein for expansion caused by freezing, closing the carton and liner, forming a depression in the side wall of the carton until the contents substantially fill the carton and excess air is expelled from the liner, sealing the liner, relieving said depression, and then freezing.

LEIGH J. McGRATH.
WAYNE L. HALL.